(12) United States Patent
Hildebrand et al.

(10) Patent No.: US 11,082,226 B2
(45) Date of Patent: Aug. 3, 2021

(54) ZERO-KNOWLEDGE IDENTITY VERIFICATION IN A DISTRIBUTED COMPUTING SYSTEM

(71) Applicant: Salesforce.com, Inc., San Francisco, CA (US)

(72) Inventors: Hal Scott Hildebrand, Moss Beach, CA (US); Prithvi Krishnan Padmanabhan, San Ramon, CA (US)

(73) Assignee: Salesforce.com, Inc., San Francisco, CA (US)

( * ) Notice: Subject to any disclaimer, the term of this patent is extended or adjusted under 35 U.S.C. 154(b) by 292 days.

(21) Appl. No.: 16/294,646

(22) Filed: Mar. 6, 2019

(65) Prior Publication Data

US 2020/0287718 A1  Sep. 10, 2020

(51) Int. Cl.
*H04L 9/32* (2006.01)
*H04L 29/08* (2006.01)
*H04L 9/06* (2006.01)

(52) U.S. Cl.
CPC .......... *H04L 9/3218* (2013.01); *H04L 9/0618* (2013.01); *H04L 9/3239* (2013.01); *H04L 67/1061* (2013.01)

(58) Field of Classification Search
None
See application file for complete search history.

(56) References Cited

U.S. PATENT DOCUMENTS

| | | |
|---|---|---|
| 2017/0242887 A1 | 8/2017 | Zhao et al. |
| 2019/0057223 A1* | 2/2019 | Hanna ............... G06F 21/6245 |
| 2019/0244243 A1* | 8/2019 | Goldberg ............ H04L 9/0637 |
| 2020/0036515 A1 | 1/2020 | Chari et al. |
| 2020/0159847 A1* | 5/2020 | Smith .................. G06F 16/27 |
| 2020/0204375 A1* | 6/2020 | Coulmeau .......... G06F 16/1865 |
| 2020/0204557 A1* | 6/2020 | Singh .................. H04L 9/0637 |
| 2020/0287719 A1 | 9/2020 | Hildebrand et al. |

OTHER PUBLICATIONS

U.S. Appl. No. 16/294,654, Non-Final Office Action dated Feb. 22, 2021, 26 pgs.
U.S. Appl. No. 16/294,654, Examiner Interview Summary dated Mar. 29, 2021, 2 pgs.

* cited by examiner

*Primary Examiner* — Taghi T Arani
*Assistant Examiner* — Joshua Raymond White
(74) *Attorney, Agent, or Firm* — Kwan & Olynick LLP

(57) ABSTRACT

For each data value associated with a data object, a respective object value identification query message that includes the data value may be sent to each of a plurality of identity nodes via a network. For each of the data values, a respective object value identification response message that includes a respective network identifier corresponding with the respective data value may be received. A local identifier may be determined based on the object value identification response messages, and a response query message including the local identifier may be transmitted.

14 Claims, 9 Drawing Sheets

ZERO-KNOWLEDGE IDENTITY VERIFICATION IN A DISTRIBUTED COMPUTING SYSTEM

FIELD OF TECHNOLOGY

This patent document relates generally to cloud computing environments, and more specifically to the secure management of personally identifying information in cloud computing environments.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

Storing personally identifying information is necessary for many cloud computing applications. For example, personally identifying information may be associated with users of a cloud computing environment and used to perform operations such as verifying identity or authorizing a user to perform a task. However, the distribution and storage of personally identifying information involves certain risks, such as the risk that the information is publicly leaked.

BRIEF DESCRIPTION OF THE DRAWINGS

The included drawings are for illustrative purposes and serve only to provide examples of possible structures and operations for the disclosed inventive systems, apparatus, methods and computer program products for secure identity management. These drawings in no way limit any changes in form and detail that may be made by one skilled in the art without departing from the spirit and scope of the disclosed implementations.

DETAILED DESCRIPTION

Figure 1:
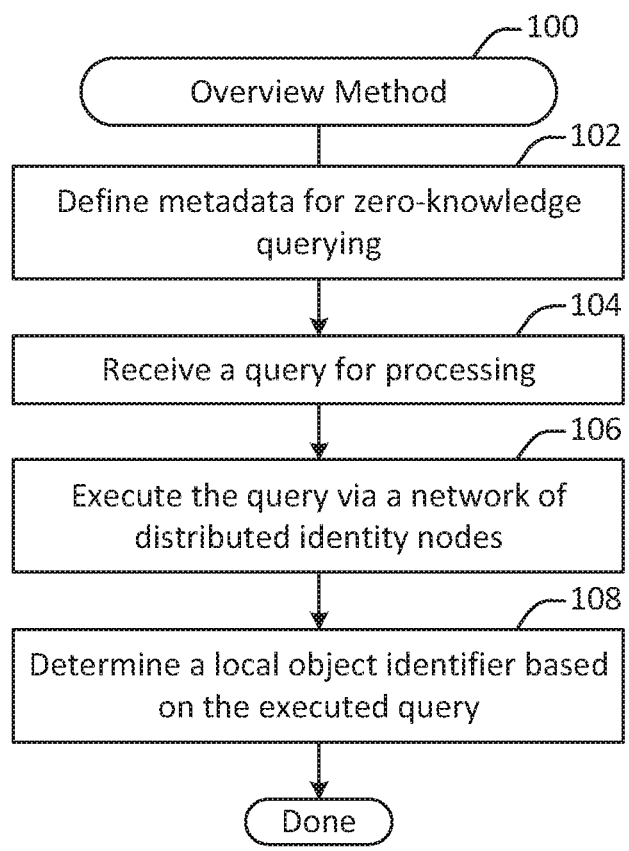
FIG. 1 illustrates an example of an overview method, performed in accordance with one or more embodiments.

According to various embodiments, techniques and mechanisms described herein facilitate secure verification of individuals, organizations, or items. Different organizations may possess different pieces of information associated with an entity. Techniques and mechanisms described herein facilitate the coordination of these entities to validate the object's identity without sharing their information with one another.

Consider the situation of individuals. In the physical world, an individual often substantiates his or her identity with documents like a driver's license. Such documents assert facts about the individual such as name, age, or eye color. However, driver's licenses don't exist on the Internet. In network-centric models in which information is decentralized, the problem grows exponentially as users must deal with many siloed systems. This decentralization results in users' information being replicated and occasionally hacked or leaked, compromising privacy and undermining security. This problem exists for virtually any kind of private information related to virtually any kind of entity.

A decentralized identity system facilitates the identification of an entity across different systems that are in a distributed decentralized network. However, conventional decentralized identity suffers from various problems. First, many identification schemes involve usernames and passwords, which typically result in replicating data (mostly out-of-sync) in different identity silos around the network. This is referred to as the Proximity Problem. Second, digital identity can be aggregated in identity hubs providing single sign-on, such as Google or Facebook, but most places (e.g., websites or computing environments) do not use such providers. This is referred to as the Scale Problem. Third, conventional identity solutions are limited by fixed database schema or attribute sets for the identified items, which is referred to as the Flexibility Problem. Fourth, conventional identity solutions rely on collections of personally identifying information for an entity, often collected without knowledge. This data is replicated over and over again in different systems, with universal identifiers such as Social Security Numbers or phone numbers used to correlate identity information, again without a subject's knowledge. This is referred to as the Privacy Problem. Fifth, the data in the many silos is often shared with others without consent, often for the benefit of the organization who controls the silo. This is referred to as the Consent Problem.

As the world moves toward network-centric information models, each system will have its own set of information for an entity. This information needs to be matched up in the decentralized world to produce a decentralized id (DID) so that the network can establish a complete view of that entity. Traditional approaches to solve this problem use standard mechanisms that involve matching and merging information and lead to many centralized hubs creating a siloed effect.

In contrast to conventional approaches, techniques and mechanisms described herein provide an identification mechanism by consensus where an entity can be identified without sharing private information and duplicating data across various systems. Techniques and mechanisms described herein also facilitate the maintaining of personal control over digital information and the application of consent-based rules to information sharing.

Consider the use case of State University System (SUS). SUS includes many organizations such as member universities that each independently store information about individuals such as students, faculty, and staff. However, SUS often needs to confirm that an individual that appears in a database associated with one of these member organizations is the same as an individual that appears in a different database associated with another member organization. Using techniques and mechanisms described herein, SUS can verify an individual's identity without replicating personally identifying data across the different member organizations.

As another example, consider the use case of NGO verification for facilitating funds transfers. NGOs in different countries use different identifiers, making it difficult to verify NGO identity in a decentralized network. Using techniques and mechanisms described herein, NGO identity may be verified while at the same time keeping the data decentralized.

Techniques and mechanisms described herein differ substantially and provide numerous advantages over conventional decentralized identity management techniques. For example, Sovrin is a decentralized, global public utility for managing a lifetime portable identity for any person, organization, or thing. Sovrin architecture involves combination of a public DLT for identity operated by permissioned nodes governed by a global non-profit foundation. However, the Sovrin system assumes that the issuer has verified the information, which is untrue in many business contexts and which presents significant scaling problems as the network grows. In contrast, techniques and mechanisms described herein provide for identity verification and management even when member nodes rely at least in part on unverified information.

As another example, conventional log-based blockchain systems may be used for identity verification and management. However, in such an approach, logs grow without limit because the blockchain maintains the entire record of transactions rather than the realized state of the transactions. In conventional log-based blockchain systems, the only mechanism for communications is via transactions against the log. Such messages are stored forever and can add up very quickly. Further, the data that those messages contain is stored forever in the log, potentially creating a possibility of exploitation. Storing data in this way may even violate data privacy regulations, since deleting the data involves appending a delete request to the log rather than actually removing data from the log. Another problem with immutable logs, a feature of conventional log-based blockchain identity management solutions, is that the query data is exposed. If the blockchain is used to represent the query process, then the query metadata will forever be on the chain and directly traceable to individuals.

In contrast, techniques and mechanisms described herein involve storing the realized state of the transactions (e.g., in a merkle database), which grows toward a stable log size as the size of the replicated data becomes stable. The reduction in log size means that there is less data to replicate across the system for new members to join the network. In addition, new members can start participating in query execution and result production without having to replicate the transaction log first. Also, requested results can be served by other members while replication proceeds in parallel, solving synchronization problems in lifecycle decisions. Further, when information is stored in an editable shared database rather than a log, the information can be deleted as necessary. Thus, although techniques and mechanisms described herein may be used in conjunction with blockchain technology, for instance to store the information in the trust ledger, the architectural differences from conventional techniques address many of the drawbacks of conventional identity management approaches. Another advantage of embodiments described herein is that although query data is replicated throughout the system, the data stored as the results of previous queries can be minimized so that the personally identifying information inherent in the queries themselves does not "leak" out of the system. For example, the query metadata does not need to be transmitted throughout the system.

According to various embodiments, techniques and mechanisms described herein involve a two-pronged approach for identification. A gossip protocol in combination with zero-knowledge proofs may be used to determine a consensus as to an entity's identity. The gossip may be based on results evaluated based on the information available. The architecture may be based on a federation of pools configured with a delegation pattern to retrieve local identity information from individual networks and provide the results to the main network that maintains a global identity.

According to various embodiments, the system may construct and execute a query to identify an entity on a field-by-field basis. The system may then evaluate candidates that match any field on a field-by-field basis to generate a confidence score. If an identity is found that exceeds a predetermined threshold, then the request may be designated as valid. For many requests, only one identity can score high enough to be valid. However, but in the event that the request validates as more than one identity, the higher scoring identity may be chosen.

FIG. 1 illustrates an example of an overview method 100, performed in accordance with one or more embodiments. According to various embodiments, the method 100 may be performed at one or more components within one or more computing services environments. For example, the method 100 may be performed at one or more nodes in communication via a network.

At 102, metadata for zero-knowledge querying is defined. In some embodiments, metadata for zero-knowledge querying may be defined by an administrator. For example, an administrator may create a data object template that includes one or more fields to be used for identification of an instance of an item represented by the data object. An example of a system that may be used to facilitate zero-knowledge querying is discussed with respect to FIG. 2.

According to various embodiments, defining metadata for zero-knowledge querying may involve specifying one or more characteristics of an item to be identified, which is represented as a data object. For example, an individual may be represented as a data object having fields such as a first name, a last name, an age, a birthday, a mailing address, one or more email addresses, one or more social networking accounts, and/or a social security number. As another example, an organization may be represented as a data object having fields such as a name, a legal form (e.g., C-corporation, S-corporation, limited liability corporation, non-profit, etc.), a state of incorporation, a mailing address, a headquarters address, a chief executive officer, and/or one or more email addresses. As yet another example, a vehicle may be represented as a data object having fields such as a body style, a color, a vehicle identification number, a make, and/or a model.

At 104, a query is received for processing. According to various embodiments, the query may include one or more data values associated with an item to be identified. The item may correspond with a data object template created as discussed with respect to operation 102. Each data value may correspond with a metadata entry associated with an instance of the data object. For example, when identifying a person, the query may include any or all of a first name, a last name, a social security number, one or more email addresses, and/or one or more social media accounts.

In particular embodiments, the query may be generated when some or all of the information included in the query has not been verified by the local system at which the query is received. For example, a particular campus within a university system may need to validate the identify of a person who supplies a first name, a last name, a social security number, and an email address. The campus may be able to verify that the person has access to the email address, for instance by sending a confirmation email. However, the campus may not be able to verify that the social security number corresponds to the person associated with that email address. Accordingly, the campus may generate a query to validate the person's identity via zero-knowledge querying.

Figure 3:
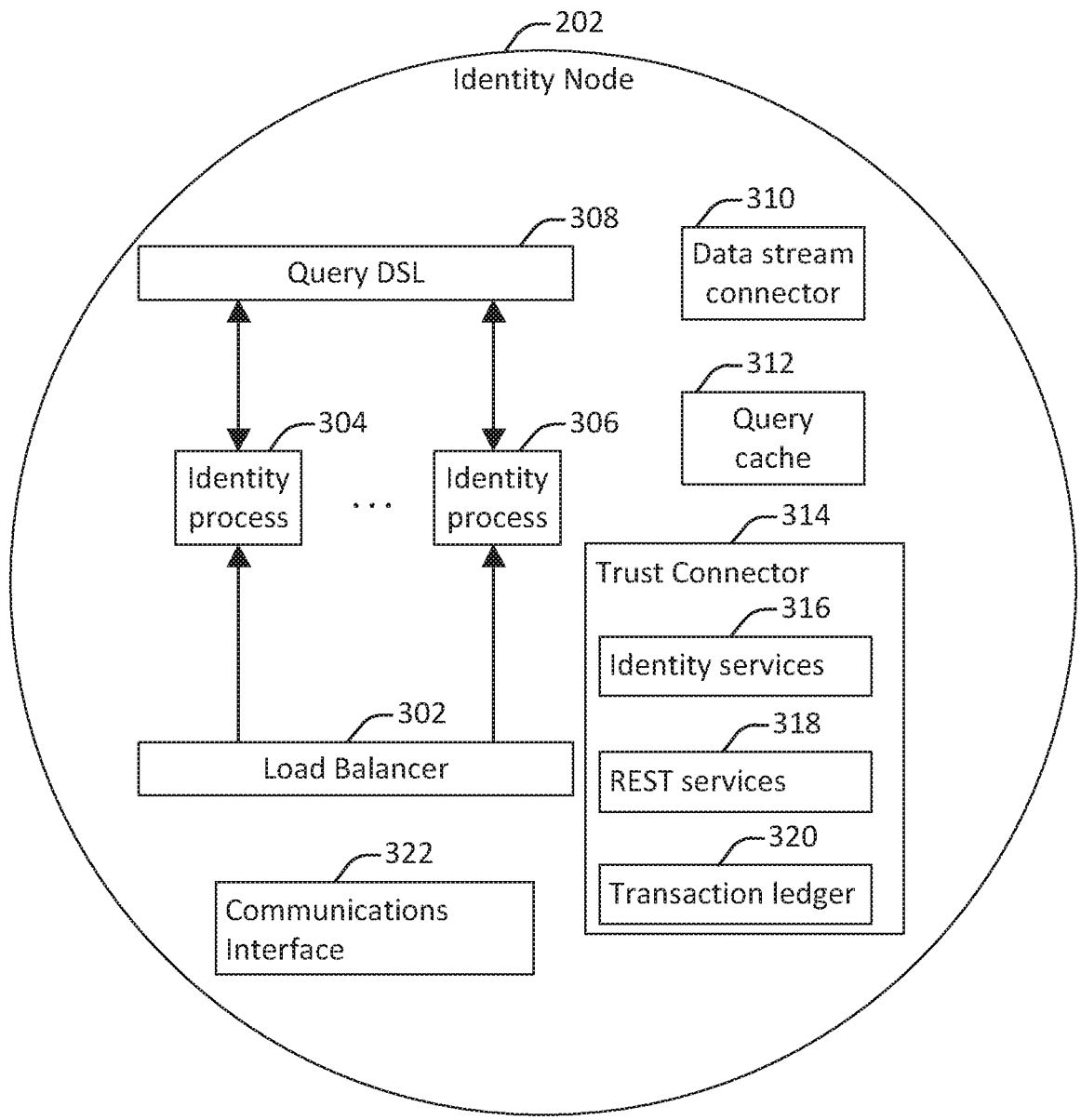
FIG. 3 illustrates an example of an identity node, configured in accordance with one or more embodiments.
Figure 4:
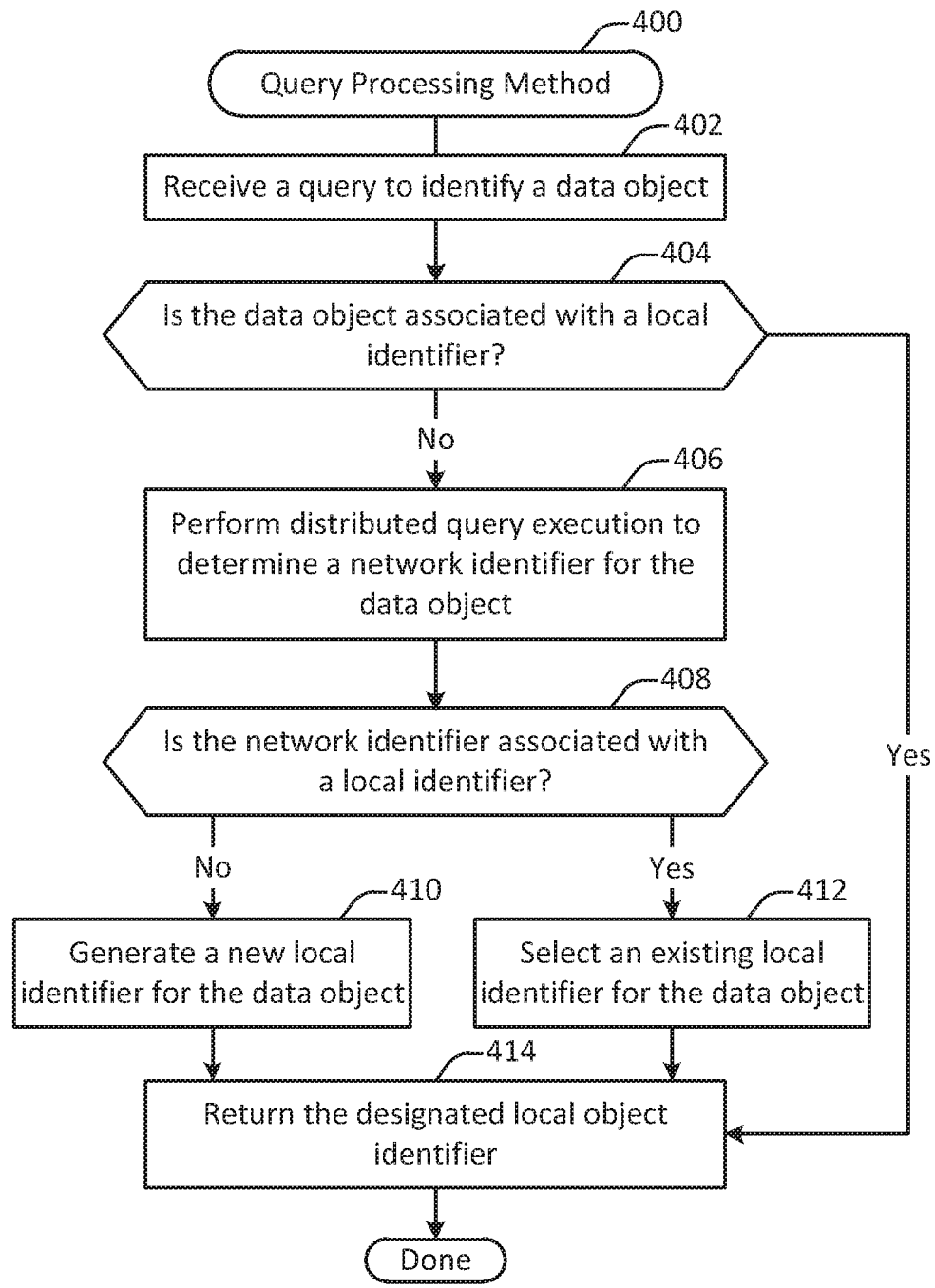
FIG. 4 illustrates an example of a method for query processing, performed in accordance with one or more embodiments.

In some implementations, the query may be received at a zero-knowledge identity node associated with the campus. FIG. 3 illustrates an example of an identity node, configured in accordance with one or more embodiments. FIG. 4 illustrates an example of a method 400 for processing such a query.

At 106, the query is executed via a network of distributed identity nodes. According to various embodiments, some or all of the distributed identity nodes may each receive a copy of the query. A node that receives the query may then investigate the identity of the item represented by the query using its own local resources. After performing such an inquiry, the node may then communicate with other distributed identity nodes to resolve the identity. The communication may occur via a technique such as a gossip protocol, which is a type of peer-to-peer communication that can be used to route data to the members of a group without necessarily involving a central registry to coordinate the action. Techniques for executing a query among distributed identity nodes are discussed in additional detail with respect to the methods 500 and 600 shown in FIGS. 5 and 6.

A local object identifier based on the executed query is determined at 108. According to various embodiments, the local object identifier provides a way for the local system that generated the query to identify the object associated with the query. The local object identifier may map to a global object identifier that is produced by the execution of the query at 106. In this way, information associated with the query may be validated against information known by other nodes in the distributed identity network without sharing information among those nodes. Techniques for determining a local object identifier are discussed in additional detail with respect to the method 400 shown in FIG. 4.

Figure 2:
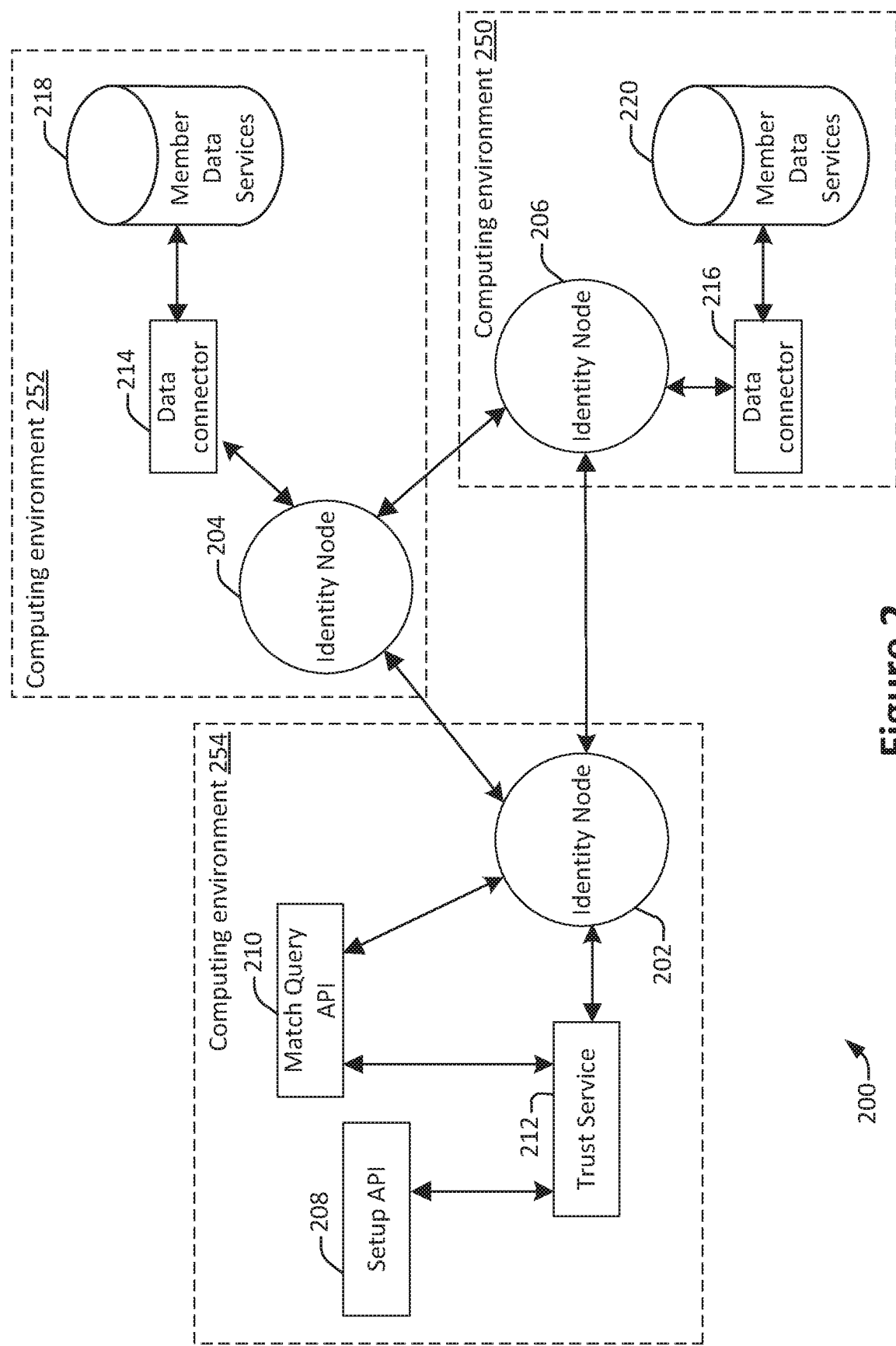
FIG. 2 illustrates an example of an arrangement of components in a distributed computing system, configured in accordance with one or more embodiments.

FIG. 2 illustrates an example of an arrangement of components in a distributed computing system 200, configured in accordance with one or more embodiments. The distributed computing system 200 includes identity nodes 202, 204, and 206, a setup API 208, a match query API 210, a trust service 212, data connectors 214 and 216, and member data services 218 and 220.

In some implementations, the setup API 208 may be used to define metadata for zero-knowledge querying. For example, as discussed with respect to operation 102 in FIG. 1, an administrator may create a data object template that includes one or more fields to be used for identification of an instance of an item represented by the data object. Alternately, a data object template may be automatically created, for instance based on a data object type associated with data objects stored in a local database.

According to various embodiments, the trust service 212 may provide a mechanism for sharing trusted information among the identity nodes. The trust service 212 may store information such as a network identifier that uniquely identifies a data object. The trust service 212 may also store one or more data values associated with the data object. For example, in the case of a person the trust service 212 may store a user identifier as well as a name, a social security number, and one or more email addresses associated with the person. The trust service 212 may store data values for only some of the data fields associated with the object, and need not need not store data values for all fields associated with the object. For example, some fields may be used to store information that has not yet been associated with the data object within the network.

In particular embodiments, the trust service 212 may be implemented at least in part via a hashed database such as a hash tree (e.g., a Merkle tree). In such a configuration, an identity node may be able to query the database to verify that information is present and/or associated with a given identifier. For example, given a network identifier for an item such as a person and a piece of information such as a social security number, a computing system may query the trust service 212 to determine whether the network identifier is associated with the social security number.

In particular embodiments, the trust service 212 may not be used to extract information. For example, given a network identifier, a computing system may not query the trust service 212 to identify a social security number corresponding to the network identifier. Similarly, given a social security number, a computing system may not query the trust service 212 to identify a network identifier corresponding to the social security number. In this way, the hashed, one-way nature of the trust service 212 may facilitate the maintenance of information privacy while at the same time permitting information verification.

In some implementations, the setup API 208 communicates with the trust service 212. For instance, the setup API 208 may configure the trust service 212 for verifying a particular type or types of item or items.

According to various embodiments, the match query API 210 may be used to generate identity queries to transmit to the identity node 202 for execution. For example, the match query API 210 may receive information about an item to be identified. If the information includes a network identifier, then the match query API may use the network identifier to query the trust service 212 to verify the information. If instead the information does not include a network identifier, or if some of the information cannot be validated via the trust service, the match query API 210 may communicate with the identity node 202 to execute a distributed query across potentially many identity nodes.

In particular embodiments, the setup API 208 and/or the Match Query API 210 may be configured as a REST (Representational State Transfer) API. In such a configuration, entities may access the API to perform operations and access information by using a uniform and predefined set of stateless operations.

Figure 5:
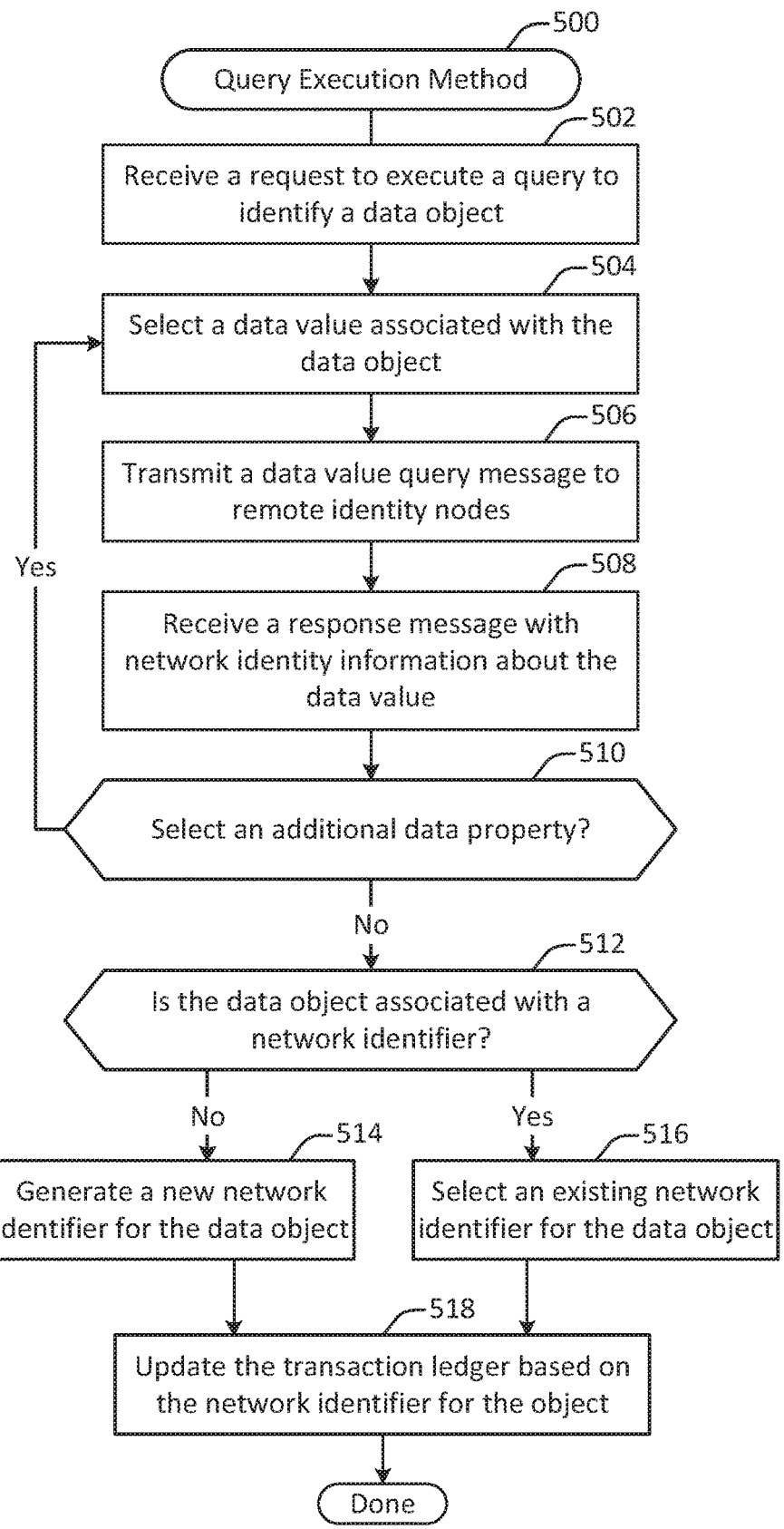
FIG. 5 illustrates an example of a method for distributed query execution, performed in accordance with one or more embodiments.

According to various embodiments, each identity node is responsible for performing a variety of operations related to identity management. For example, the identity node 202 may receive identity queries from the match query API 210 and then communicate with other identity nodes to execute the query. FIG. 4 illustrates an example of a method 400 for processing a query. As another example, the identity node 202 may receive identity queries from other identity nodes and then participate in the execution of that query. FIG. 5 illustrates an example of a method 500 for executing a query.

According to various embodiments, the member data services 218 and 220 include repositories of information that may be used to identify items. Each member data service may correspond to one or more databases associated with an entity or organization. For example, member data services 218 may correspond to user accounts at Microsoft, while member data services 220 may correspond to user accounts at Google. As another example, member data services 218 may correspond to user accounts for one or more services offered by a cloud computing system, while member data services 220 may correspond to a different one or more services offered by the same cloud computing system. As still another example, member data services 218 may correspond to user accounts associated with one or more entities within a cloud computing system, while member data services 220 may correspond user accounts associated with a different one or more entities within the same cloud computing system.

According to various embodiments, computing environments 250, 252, and 254 may correspond with different entities or organizations. For example, the computing environment 250 may correspond with Microsoft, while the computing environment 252 may correspond with Google. Alternately, different computing environments may correspond with different portions of the same entity or organization.

In particular embodiments, different member data services may store different information about the same item. For example, a user may be associated with a name and an email address. However, the user's social security number may be stored in association with the user in member data services 218, while the user's home address may be stored in association with the user in member data services 220. In this example, if the user provides her social security number for storage in the computing environment 250, techniques and mechanisms described herein may allow the computing environment 250 to verify that the social security is known to correspond with the user.

In some implementations, verification may be performed while maintaining privacy and data security in other respects. For example, the computing environment 252 need not transmit the user's social security number directly to the computing environment 250. As another example, the computing environment 250 may not be able to determine which of the distributed identity nodes or other computing environments knew the user's social security number. As another example, the computing environment 250 may not be able to use the social security number to obtain other information about the user that the user did not provide to the computing environment 250.

According to various embodiments, the data connectors 214 and 216 may be used to query the member data services 218 and 220. For instance, the data connectors may provide APIs to the identity nodes for interacting with member data services. A data connector may be adapted to communicate with a specific member data services repository, since different member data services repositories may be configured differently.

In some implementations, different identity nodes may be associated with the same organizational entity. For example, a cloud computing service provider may be associated with multiple data service repositories that each maintains different identity information. These different data service repositories may be associated with different identity nodes. As another example, a single member data service repository may be associated with multiple identity nodes, for instance for load balancing.

For the purpose of illustration, the system 200 is shown as including three identity nodes and three computing environments. However, in various embodiments the system 200 may include hundreds or thousands of identity nodes and/or computing environments. Similarly, for the purpose of illustration the system 200 is shown as having data connectors and member data services in communication with the identity nodes 204 and 206, while identity node 202 is in communication with the match query API 210 and the trust service 212. However, in various embodiments any identity node may be in communication with one or more match query APIs, trust services, data connectors, setup APIs, and/or member data services. For the purpose of illustration, the system 200 is shown as having one-to-one relationships between various components. However, in various embodiments various components may be arranged in one-to-many or many-to-many relationships.

According to various embodiments, identity nodes may communicate with one another at least in part via a gossip protocol. Because digital communications networks such as the internet typically do not support multicasting a message to all members of a group at once, the number of point-to-point communication channels between nodes in a network grows with the square of the number of nodes. Gossip communication provides an alternative, probabilistic approach, working as an epidemic of information. Gossip messages spread quickly throughout the members of a network, with the number of "hops" between members on the order of log(N) to reach all network members, where N is the number of nodes.

In some implementations, gossip communication may be used to support any of a variety of operations discussed herein. For instance, gossip communication may be used to distribute either or all of query messages, consensus messages, and result messages between identity nodes. In the case of consensus messages, gossip communication can be used to facilitate consensus on potentially conflicting identity information. Gossip communication can also be used to spread the result of a query across the entire network.

FIG. 3 illustrates an example of an identity node 202, configured in accordance with one or more embodiments. The identity node 202 includes a load balancer 302, identity processes 304 through 306, a query domain-specific language (DSL) 308, a data stream connector 310, a query cache 312, and a trust connector 314. The trust connector 314 includes identity services 316, REST services 318, and a transaction ledger 320.

According to various embodiments, the identity node 202 may be implemented on one or more computing devices in a cloud computing environment. For example, the identity node 202 may be executed within a virtual machine in a cloud computing environment such as Amazon Web Services (AWS), Microsoft Azure, or Google Cloud.

According to various embodiments, the load balancer 302 divides identity query execution requests for processing among a number of different processes. FIG. 3 shows two processes 304 and 306 for the purpose of illustration. However, any suitable number of processes may be used. Each process is configured to execute one or more identity query requests. For example, a process may perform operations such as retrieving or storing information in the query cache 312, communicating with member data services via the query DSL 308 and/or data stream connector 310, communicating with the trust connector 314, and/or communicating with other identity nodes via the trust connector 314.

In some implementations, the query DSL 308 may be used to translate queries from the language common to the identity nodes to a domain-specific language for queries or Lambda functions that the client uses to connect to information. For example, Microsoft may store item information in one type of database, while Google may store item information in another type of database. The translated queries may then be sent to the member data services via the data stream connector 310.

In some embodiments, the query cache 312 may maintain a record of queries sent to the member data services along with the results of those queries. In this way, the identity node need not repeatedly query the member data services for the same information over a short time span. Instead, such information may be retrieved from the query cache 312. However, the identity node may also periodically refresh the information stored in the query cache 312 to capture changes that have occurred in the member data services. For instance, the query cache 312 may be used to limit queries for the same information to a period of once per hour, once per day, or some other time interval.

According to various embodiments, the trust connector 314 may be used to facilitate communications between the identity node 202 and the trust service 212. The identity services module 316 may be used to perform identity queries. For example, the identity services module 316 may receive a query that includes a network identifier and one or more pieces of information. The identity services module 316 may then query the transaction ledger module 320 to determine if the information k associated with the network identifier.

In some implementations, the REST services 318 may be used to update the transaction ledger 320. For instance, when it is determined that a piece of information is associated with a network identifier, the transaction ledger 320 may be updated to include a hash of the information that is associated with the network identifier. In this way, the identity services 316 may later be used to determine if the piece of information is associated with the network identifier by hashing the information and comparing it with the information stored in the ledger. In some instances, a piece of information may be disassociated with a network identifier. For instance, the piece of information may later be associated with a different and conflicting network identifier.

In some embodiments, the transaction ledger 320 may communicate with the trust service 212 to store a realized state of the transactions adding or removing information in association with various network identifiers. Such information may be modified by the REST services 318 and queried by the identity services 316. In particular embodiments, trusted information may be stored in the transaction ledger via blockchain.

According to various embodiments, the communications interface 322 may be used to support communication between the different identity nodes. For example, the identity nodes may communicate to share queries for execution, to gossip about query results, or to communicate information about the trust ledger 320.

FIG. 4 illustrates an example of a method 400 for query processing, performed in accordance with one or more embodiments. According to various embodiments, the method 400 may be performed in order to process a query to validate information about an item. The method 400 may be performed at one or more components in a computing environment, such as the computing environment 254 shown in FIG. 2.

A query to identify a data object is received at 402. In some implementations, the query may be received at the match query API 210 shown in FIG. 2. The query may include information that may be associated with a data object but that may need to be verified. For example, a website user may request to create a user account and may provide information such as a name, an email address, and a social security number.

At 404, a determination is made as to whether the data object is associated with a local identifier. In some implementations, the determination may be made by querying a database local to the computing environment 254. If all of the information associated with the query is linked to the same local identifier, then additional verification may not need to be performed. If instead some or all of the information associated with the query is not linked to a local identifier, then the information may be verified.

Distributed query execution is performed at 406 to determine a network identifier for the data object. As part of the distributed query execution, the match query API 210 may retrieve metadata from the trust service 212. The metadata may indicate information such as which fields are associated with the data object. The match query API 210 may use this information to formulate the query or queries. The query or queries may then be distributed to identity nodes throughout the network. Additional details regarding distributed query execution are discussed with respect to the methods 500 and 600 shown in FIGS. 5 and 6.

In some instances, distributed query execution need not be performed for one or more data values. For example, one or more data values may be validated based on communication with the trust ledger, for instance when the information associated with the data object is already stored in the trust ledger. Alternately, or additionally, the query execution process may involve one or more queries to member data services, for instance when some or all of the information associated with the data object is not yet stored in the trust ledger.

A determination is made at 408 as to whether the network identifier is associated with a local identifier. The match query API 210 may maintain a correspondence table between network identifiers stored in the transaction ledger and known to the trust service 212, and local identifiers that identify data objects within the local computing environment. For example, a person may have a network identifier that identifies the person within the trust ledger, and a local identifier for each computing environment in which the person has an account.

If the network identifier is not associated with a local identifier, then a new network identifier may be generated at 410. If instead the network identifier is already associated with a local identifier, then the existing local identifier is selected at 412. According to various embodiments, generating a new local identifier may involve one or more of a variety of operations. For example, a new local user account or other object representation may be created. As another example, a new entry may be created in the correspondence table discussed with respect to operation 408.

At 414, the designated local identifier is returned. The designated local identifier may then be used by the computing environment to perform further processing. In some implementations, the method 400 may also return an indication as to which pieces of information associated with the data object have been verified. For example, the system may be able to verify a social security number associated with a user account, but not an address. In some instances, a lack of verification may prompt the computing environment to require additional information from the user, such as supporting evidence for the information. Alternately, or additionally, the computing environment may simply treat some information as unverified.

FIG. 5 illustrates an example of a method 500 for distributed query execution, performed in accordance with one or more embodiments. According to various embodiments, the method 500 may be performed at one or more components within a computing system, such as the identity node 202 shown in FIG. 2.

At 502, a request to execute a query to identify a data object is received. In some implementations, the request may be generated as part of a query processing method such as the method 400 shown in FIG. 4. For example, the request may be generated at operation 406. The request may include information such as one or more data values associated with the data object.

A data value associated with the data object is selected at 504. According to various embodiments, the data values may be selected in any suitable order, such as in sequence, at random, or in parallel.

A data value query message is transmitted to one or more remote identity nodes at 506. In some implementations, the data value query message may be transmitted to all of the identity nodes. Alternately, the data value query message may be transmitted to only a portion of the identity nodes.

In particular embodiments, the data value query message may be batched and/or interleaved with other data value query messages. In this way, a recipient of the data value query message may be unable to correlate the messages to determine from the messages alone that different data values are associated with the same data object. Thus, the transmission of the data value query messages to the remote identity nodes may occur in an order different than that shown in FIG. 5. For example, batches of data value query messages may be transmitted at regular intervals (e.g., once per second, once per millisecond, once per minute, etc.) or when a designated number of such requests have been received.

In some implementations, the data value query message may include only a limited amount of information. For example, the data value query message may identify only the type of data object and type of data value associated with the query.

In some implementations, the data value query message may be transmitted in such a way that the origin of the data value query message is disguised. For example, the identity nodes may employ a gossip protocol to transmit messages, and the data value query message may be transmitted along with the retransmission of other messages received from other identity nodes.

A response message with network identity information about the data value is received at 508. According to various embodiments, the response message may identify a network identifier associated with the data value if one exists. Alternately, or additionally, the response message may indicate that the data value is not associated with an existing network identifier. The network identity information may be determined via a distributed process involving a plurality of identity nodes. Additional details regarding such a process are discussed with respect to the method 600 shown in FIG. 6.

A determination is made at 510 as to whether to select an additional data property. As discussed with respect to the operation 504, data properties may be selected for querying in any suitable order.

A determination is made be made at 512 as to whether the data object is associated with one or more existing network identifiers. In some implementations, the determination may involve determining whether any of the response messages received at 508 include a network identifier associated with any one of the data values selected at 504.

If the data object is not associated with an existing network identifier, then a new network identifier for the data object is generated at 514. According to various embodiments, the new network identifier may then be associated with some or all of the information associated with the data objects.

In some embodiments, the new network identifier may be associated only with those data values that have been independently verified. For example, the new network identifier may be associated with an email address that has been verified by transmitting a verification email, to which the user responds to clicking a link or transmitting a response.

If the data object is associated with an existing network identifier, then an existing network identifier is selected for the data object at 516. In some situations, only a single network identifier may be identified. For example, only a single data value may have been selected at 504 for verification. As another example, multiple data values may have been selected at 504, but the response message for each data value received at 508 may have indicated the same network identifier as being associated with the different data values.

In some implementations, more than one network identifier may be identified. For example, a person's address may be associated with one network identifier, while the person's social security number may be associated with a different network identifier, for instance if the address and social security number had never been linked in a single account. In such a situation, the system may select one of the network identifiers to use, such as the network identifier that was identified as being associated with the greatest number of data values.

At 518, the transaction ledger is updated based on the network identifier for the object. According to various embodiments, the transaction ledger may be updated to include the new network identifier generated at 514 or the network identifier selected at 514. In particular embodiments, updating the transaction ledger to reflect the query result may allow the system to resolve conflicts in an automated, self-healing manner. Over time, successive verification queries for conflicted information may lead the system to converge on a network identifier for the data object. Then, conflicting network identifiers that are associated with only a small portion of data values associated with the object may be removed.

Figure 6:
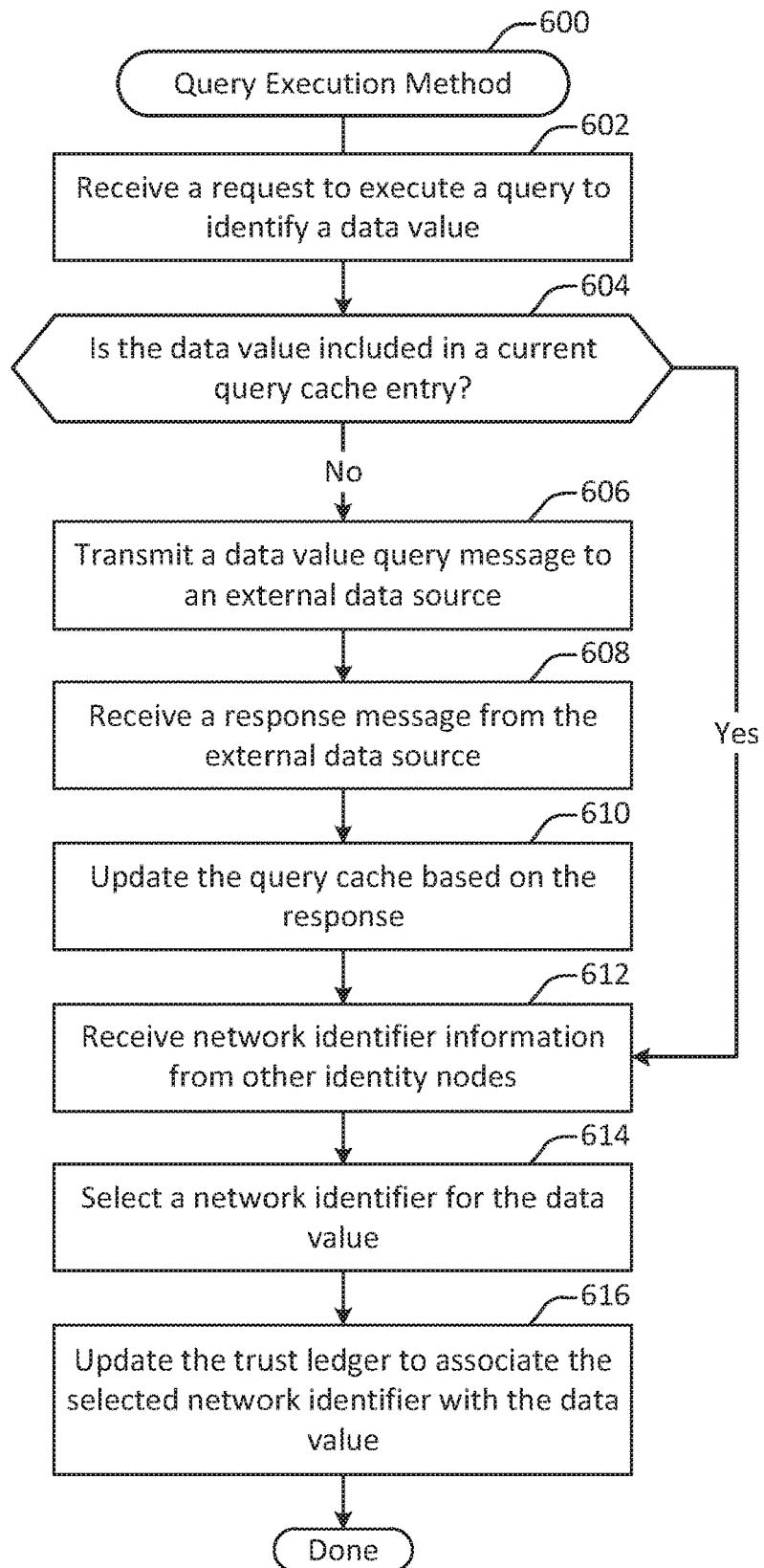
FIG. 6 illustrates an example of a method for remote query execution, performed in accordance with one or more embodiments.

FIG. 6 illustrates an example of a method 600 for remote query execution, performed in accordance with one or more embodiments. According to various embodiments, the method 600 may be executed on an identity node in the network.

In particular embodiments, the method 600 may be performed at a selected one of the identity nodes that has been elected as a "leader" to determine a consensus as to the network identifier based on the distributed queries run by various identity nodes in the system. For example, the leader node may be elected by computing a hash of the data value and consulting a correspondence table that links hash values to leaders. Alternately, any suitable election mechanism may be employed.

In some implementations, some or all of the operations described with respect to FIG. 6 may be executed for each of the queried data values on some or all of the identity nodes in the network. For instance, the identity node on which the method 600 is executed may be the local identity node on which the query is initially received, or it may be a remote identity node located elsewhere in the network.

At 602 a request is received to execute a query to identify a data value. According to various embodiments, the request may be generated as discussed with respect to the operation 506 shown in FIG. 5.

A determination is made at 604 as to whether the data value is included in a current query cache entry. According to various embodiments, the query cache may store queries and query results received from the member data services to avoid repeatedly querying the member data services for the same information over a short time span. Each query result may identify, for example, a data value associated with a data object and a network identifier associated with that data value.

In some implementations, the query cache may include an entry for the data value, but the entry may be outdated. In such a situation, the system may ignore the query cache entry and communicate with the member data services to refresh the query.

A data value query message is transmitted to an external data source at 606. According to various embodiments, the external data source may be a member data services repository such as the repository 218 discussed with respect to FIG. 2. The data value query message may identify the data value and the object type with which the data value is associated.

In some implementations, the data value query message may be transmitted via the query DSL 308 and the data stream connector 310. The query DSL 308 may convert the query into a language specific to the focal member data services repository, while the data stream connector 310 may facilitate the communication between the identity node and the member data services repository.

A response message from the external data source is received at 608. In some implementations, the response message may indicate whether the data value is known to the member data services as being associated with a network identifier. If such an identifier is located, then it may be included in the response message. Otherwise, the response message may include an indication that no such identifier was found.

In particular embodiments, the network identifier may be determined by the member data services querying a database to identify a local identifier associated with the data value. The local identifier may then be used to query a correspondence table that identifies a correspondence between local identifiers and network identifiers. If a corresponding network identifier is found, then it may be included with the response received at 608.

The query cache is updated at 610 based on the response. Updating the query cache may involve storing information such as the query sent to the external data source, the date and time at which the query was sent, and the response received from the external data source, including any network identifier associated with the data value.

Network identifier information is received from other identity nodes at 612. According to various embodiments, the network identifier information may include one or more network identifiers associated with the data value and identified by identity nodes other than the node on which the method 600 is executed.

At 614, a network identifier is selected for the data value. In some implementations, the network identifier may be selected based on consensus. For example, the network identifier received from the greatest number of identity nodes may be selected. As another example, another selection mechanism may be used. For instance, the responses from different identity nodes may be weighted differently, and a weighted average used to select the consensus network identifier. The weighting scheme may depend at least in part based on the query parameters. For instance, if a university seeks to identify a new student at campus A, and the student claims to be already enrolled at campus B, then the identity node at campus B may be upweighted when determining the consensus. In some implementations, identity nodes may communicate using Command Query Responsibility Segregation (CQRS) patterns.

The trust ledger is updated at 616 to associate the selected network identifier with the data value. According to various embodiments, updating the trust ledger may involve communicating with the REST services 318. The REST services 318 may then hash the data value and store the hashed value in the transaction layer in association with the selected network identifier.

In particular embodiments, one or more of the operations shown in FIG. 6 may not be performed by some or all identity nodes. For example, a node not elected as the leader may not perform operations 612-616, and may instead transmit network identity information to the leader.

According to various embodiments, one or more of the techniques and mechanisms described with respect to FIGS. 1-6 or elsewhere herein may be implemented as a continuous workflow. For example, an identity node that has critical information required to identify an unknown item may be down during an attempted query execution for that item. As another example, the member services associated with an identity node may have updated information, rendering a previously-generated response to a query inaccurate. To address such situations, identity nodes may interact in an asynchronous, event-oriented fashion in the form of a continuous workflow, rather than a request/response.

In particular embodiments, a continuous workflow may involve operations such as periodically refreshing results stored in a query cache. When such an operation changes the value stored in the cache, the identity node on which the cache is located may transmit one or more messages to re-execute an identity query for the relevant data value across the network of identity nodes.

In particular embodiments, a continuous workflow may involve operations such as executing queries asynchronously. For instance, in some configurations the identity nodes may take quite a while to come to a consensus about the identity of an item. Accordingly, communication across the network may be conducted in an asynchronous manner.

Figure 7:
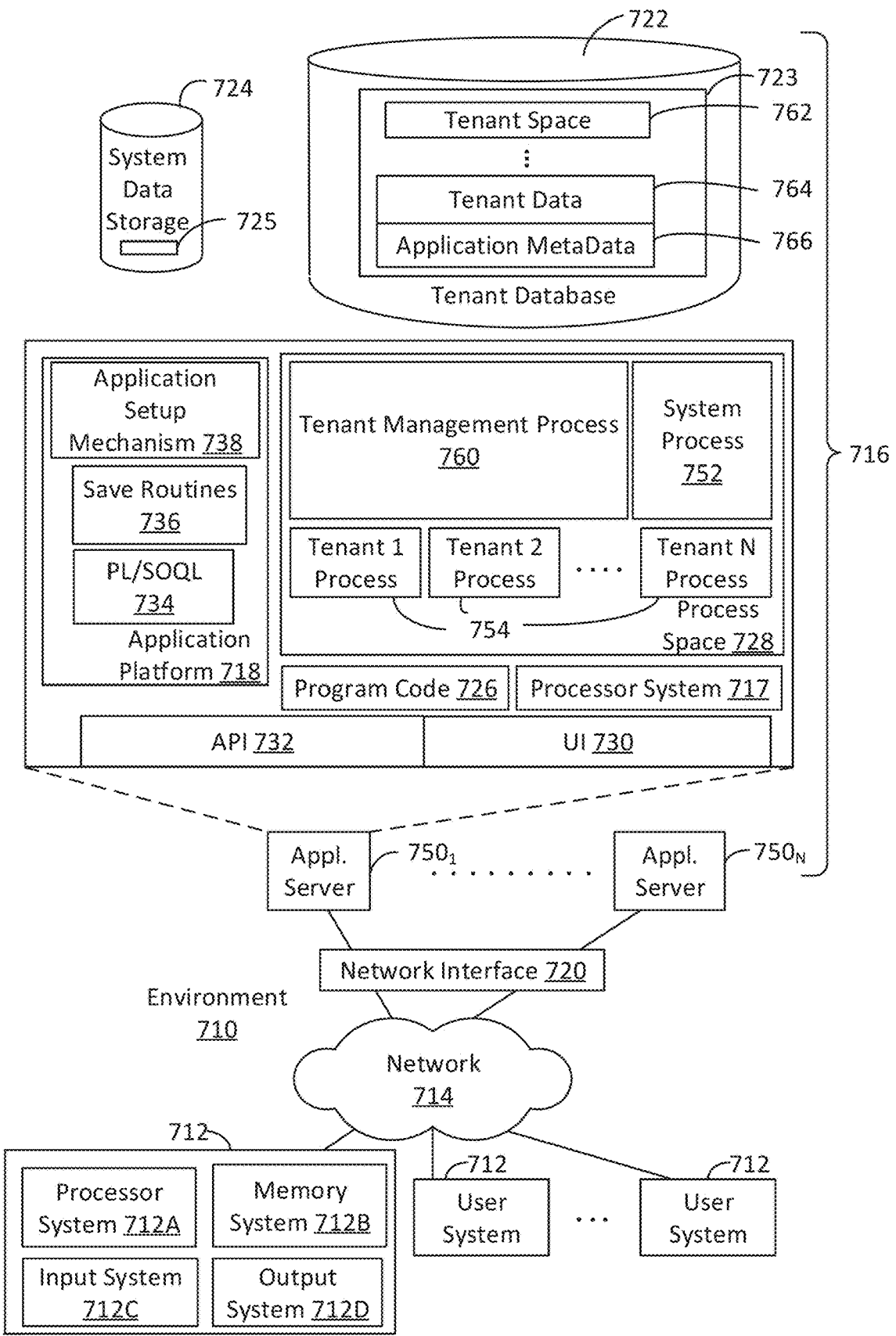
FIG. 7 shows a block diagram of an example of an environment that includes an on-demand database service configured in accordance with some implementations.

FIG. 7 shows a block diagram of an example of an environment 710 that includes an on-demand database service configured in accordance with some implementations. Environment 710 may include user systems 712, network 714, database system 716, processor system 717, application platform 718, network interface 720, tenant data storage 722, tenant data 723, system data storage 724, system data 725, program code 726, process space 728, User Interface (UI) 730, Application Program Interface (API) 732, PL/SOQL 734, save routines 736, application setup mechanism 738, application servers 750-1 through 750-N, system process space 752, tenant process spaces 754, tenant management process space 760, tenant storage space 762, user storage 764, and application metadata 766. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 716, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 18 may be a framework that allows the creation, management, and execution of applications in system 716. Such applications may be developed by the database service provider or by users or third-party application developers accessing the service. Application platform 718 includes an application setup mechanism 738 that supports application developers' creation and management of applications, which may be saved as metadata into tenant data storage 722 by save routines 736 for execution by subscribers as one or more tenant process spaces 754 managed by tenant management process 760 for example. Invocations to such applications may be coded using PL/SOQL 734 that provides a programming language style interface extension to API 732. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 766 for a subscriber making such an invocation. Such system processes may also manage execution of application metadata 766 as an application in a virtual machine.

In some implementations, each application server 750 may handle requests for any user associated with any organization. A load balancing function (e.g., an F5 Big-IP load balancer) may distribute requests to the application servers 750 based on an algorithm such as least-connections, round robin, observed response time, etc. Each application server 750 may be configured to communicate with tenant data storage 722 and the tenant data 723 therein, and system data storage 724 and the system data 725 therein to serve requests of user systems 712. The tenant data 723 may be divided into individual tenant storage spaces 762, which can be either a physical arrangement and/or a logical arrangement of data. Within each tenant storage space 762, user storage 764 and application metadata 766 may be similarly allocated for each user. For example, a copy of a user's most recently used (MRU) items might be stored to user storage 764. Similarly, a copy of MRU items for an entire tenant organization may be stored to tenant storage space 762. A UI 730 provides a user interface and an API 732 provides an application programming interface to system 716 resident processes to users and/or developers at user systems 712.

System 716 may implement a web-based information verification system. For example, in some implementations, system 716 may include application servers configured to implement and execute identity verification software applications. The application servers may be configured to provide related data, code, forms, web pages and other information to and from user systems 712. Additionally, the application servers may be configured to store information to, and retrieve information from a database system. Such information may include related data, objects, and/or Webpage content. With a multi-tenant system, data for multiple tenants may be stored in the same physical database object in tenant data storage 722, however, tenant data may be arranged in the storage medium(s) of tenant data storage 722 so that data of one tenant is kept logically separate from that of other tenants. In such a scheme, one tenant may not access another tenant's data, unless such data is expressly shared.

Several elements in the system shown in FIG. 7 include conventional, well-known elements that are explained only briefly here. For example, user system 712 may include processor system 712A, memory system 712B, input system 712C, and output system 712D. A user system 712 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 712 to access, process and view information, pages and applications available from system 716 over network 714. Network 714 may be any network or combination of networks of devices that communicate with one another, such as any one or any combination of a LAN (local area network), WAN (wide area network), wireless network, or other appropriate configuration.

The users of user systems 712 may differ in their respective capacities, and the capacity of a particular user system 712 to access information may be determined at least in part by "permissions" of the particular user system 712. As discussed herein, permissions generally govern access to computing resources such as data objects, components, and other entities of a computing system, such as an identity verification system, a social networking system, and/or a CRM database system. "Permission sets" generally refer to groups of permissions that may be assigned to users of such a computing environment. For instance, the assignments of users and permission sets may be stored in one or more databases of System 716. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 716 may provide on-demand database service to user systems 712 using an MTS arrangement. By way of example, one tenant organization may be a company that employs a sales force where each salesperson uses system 716 to manage their sales process. Thus, a user in such an organization may maintain contact data, leads data, customer follow-up data, performance data, goals and progress data, etc., all applicable to that user's personal sales process (e.g., in tenant data storage 722). In this arrangement, a user may manage his or her sales efforts and cycles from a variety of devices, since relevant data and applications to interact with (e.g., access, view, modify, report, transmit, calculate, etc.) such data may be maintained and accessed by any user system 712 having network access.

When implemented in an MTS arrangement, system 716 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 716 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 716 may also maintain system-level data usable by multiple tenants or other data. Such system-level data may include industry reports, news, postings, and the like that are sharable between tenant organizations.

In some implementations, user systems 712 may be client systems communicating with application servers 750 to request and update system-level and tenant-level data from system 716. By way of example, user systems 712 may send one or more queries requesting data of a database maintained in tenant data storage 722 and/or system data storage 724. An application server 750 of system 716 may automatically generate one or more SQL statements (e.g., one or more SQL queries) that are designed to access the requested data. System data storage 724 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. In particular embodiments, entity tables may correspond to objects that may be verified according to techniques and mechanisms described herein. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, ail custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 8A:
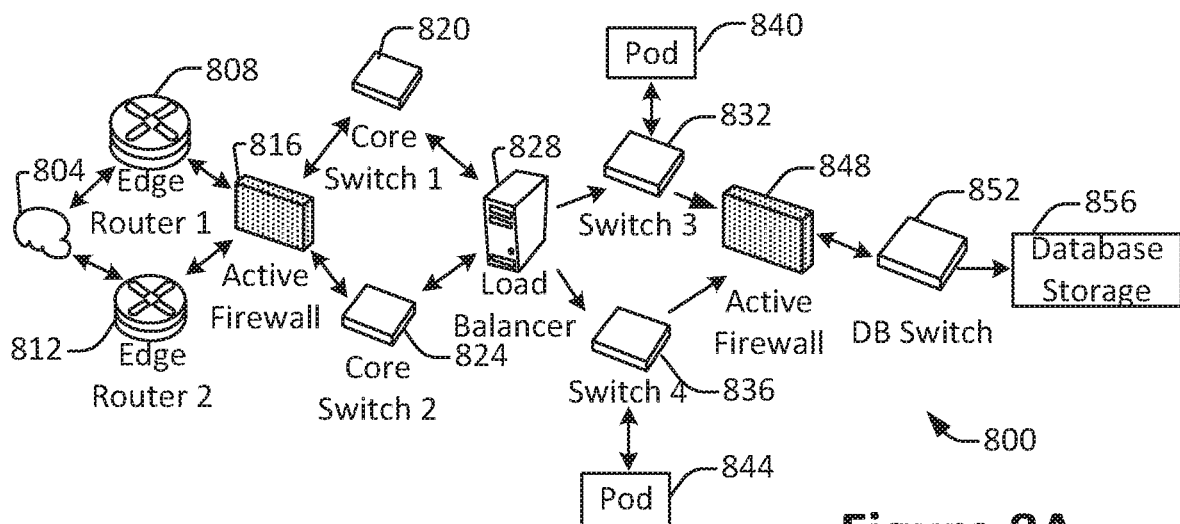
FIG. 8A shows a system diagram of an example of architectural components of an on-demand database service environment, configured in accordance with some implementations.

FIG. 8A shows a system diagram of an example of architectural components of an on-demand database service environment 800, configured in accordance with some implementations. A client machine located in the cloud 804 may communicate with the on-demand database service environment via one or more edge routers 808 and 812. A client machine may include any of the examples of user systems ?12 described above. The edge routers 808 and 812 may communicate with one or more core switches 820 and 824 via firewall 816. The core switches may communicate with a load balancer 828, which may distribute server load over different pods, such as the pods 840 and 844 by communication via pod switches 832 and 836. The pods 840 and 844, which may each include one or more servers and/or other computing resources, may perform data processing and other operations used to provide on-demand services. Components of the environment may communicate with a database storage 856 via a database firewall 848 and a database switch 852.

Accessing an on-demand database service environment may involve communications transmitted among a variety of different components. The environment 800 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 8A and 8B.

The cloud 804 refers to any suitable data network or combination of data networks, which may include the Internet. Client machines located in the cloud 804 may communicate with the on-demand database service environment 800 to access services provided by the on-demand database service environment 800. By way of example, client machines may access the on-demand database service environment 800 to retrieve, store, edit, and/or process identity verification information.

In some implementations, the edge routers 808 and 812 route packets between the cloud 804 and other components of the on-demand database service environment 800. The edge routers 808 and 812 may employ the Border Gateway Protocol (BGP). The edge routers 808 and 812 may maintain a table of IP networks or 'prefixes', which designate network reachability among autonomous systems on the internet.

In one or more implementations, the firewall 816 may protect the inner components of the environment 800 from internet traffic. The firewall 816 may block, permit, or deny access to the inner components of the on-demand database service environment 800 based upon a set of rules and/or other criteria. The firewall 816 may act as one or more of a packet filter, an application gateway, a stateful filter, a proxy server, or any other type of firewall.

In some implementations, the core switches 820 and 824 may be high-capacity switches that transfer packets within the environment 800. The core switches 820 and 824 may be configured as network bridges that quickly route data between different components within the on-demand database service environment. The use of two or more core switches 820 and 824 may provide redundancy and/or reduced latency.

In some implementations, communication between the pods 840 and 844 may be conducted via the pod switches 832 and 836. The pod switches 832 and 836 may facilitate communication between the pods 840 and 844 and client machines, for example via core switches 820 and 824. Also or alternatively, the pod switches 832 and 836 may facilitate communication between the pods 840 and 844 and the database storage 856. The load balancer 828 may distribute workload between the pods, which may assist in improving the use of resources, increasing throughput, reducing response times, and/or reducing overhead. The load balancer 828 may include multilayer switches to analyze and forward traffic.

In some implementations, access to the database storage 856 may be guarded by a database firewall 848, which may act as a computer application firewall operating at the database application layer of a protocol stack. The database firewall 848 may protect the database storage 856 from application attacks such as structure query language (SQL) injection, database rootkits, and unauthorized information disclosure. The database firewall 848 may include a host using one or more forms of reverse proxy services to proxy traffic before passing it to a gateway router and/or may inspect the contents of database traffic and block certain content or database requests. The database firewall 848 may work on the SQL application level atop the TCP/IP stack, managing applications' connection to the database or SQL management interfaces as well as intercepting and enforcing packets traveling to or from a database network or application interface.

In some implementations, the database storage 856 may be an on-demand database system shared by many different organizations. The on-demand database service may employ a single-tenant approach, a multi-tenant approach, a virtualized approach, or any other type of database approach. Communication with the database storage 856 may be conducted via the database switch 852. The database storage 856 may include various software components for handling database queries. Accordingly, the database switch 852 may direct database queries transmitted by other components of the environment (e.g., the pods 840 and 844) to the correct components within the database storage 856.

Figure 8B:
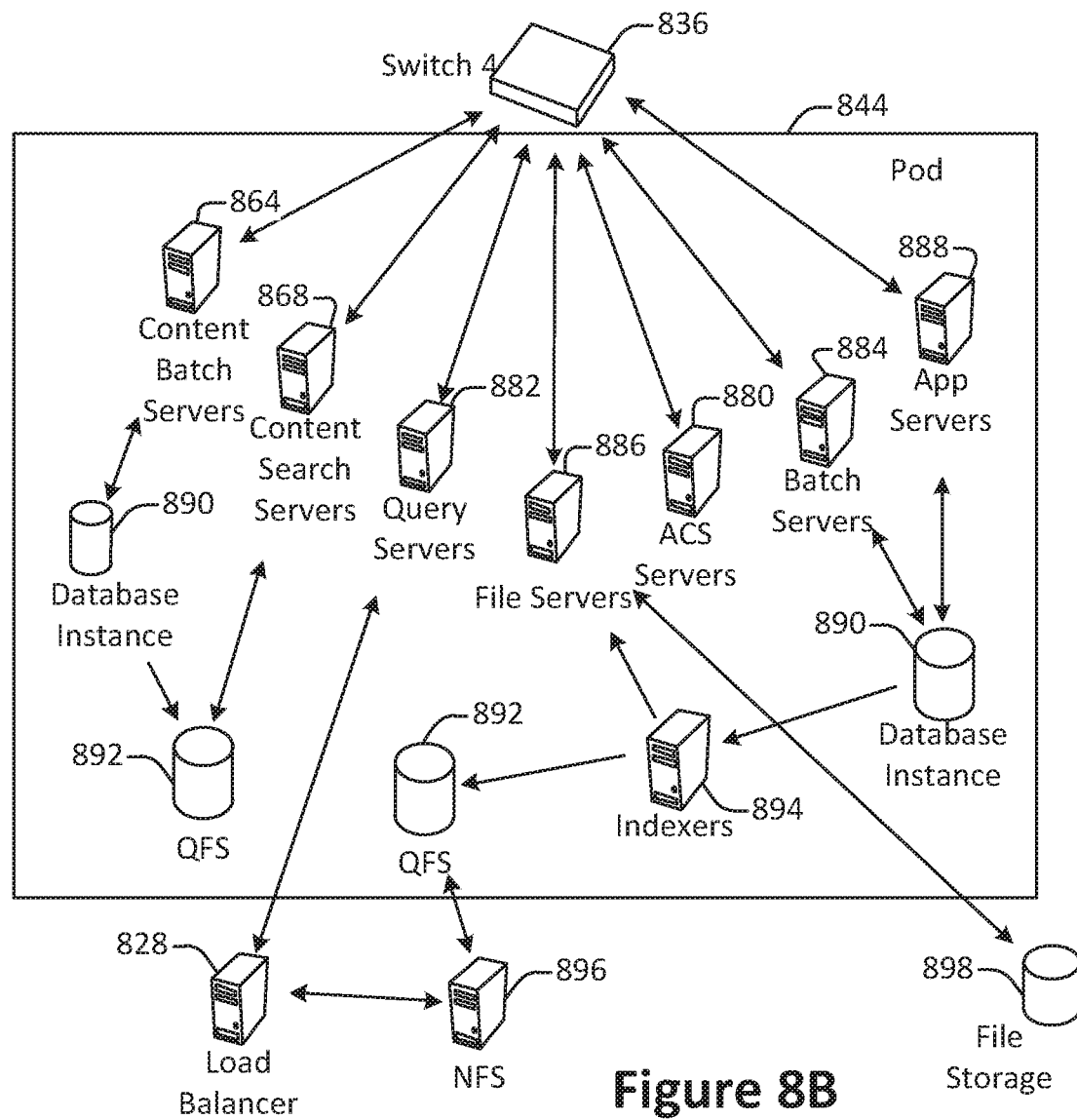
FIG. 8B shows a system diagram further illustrating an example of architectural components of an on-demand database service environment, in accordance with some implementations.

FIG. 8B shows a system diagram further illustrating an example of architectural components of an on-demand database service environment, in accordance with some implementations. The pod 844 may be used to render services to user(s) of the on-demand database service environment 800. The pod 844 may include one or more content batch servers 864, content search servers 868, query servers 882, file servers 886, access control system (ACS) servers 880, batch servers 884, and app servers 888. Also, the pod 844 may include database instances 890, quick file systems (QFS) 892, and indexers 894. Some or all communication between the servers in the pod 844 may be transmitted via the switch 836.

In some implementations, the app servers 888 may include a framework dedicated to the execution of procedures (e.g., programs, routines, scripts) for supporting the construction of applications provided by the on-demand database service environment 800 via the pod 844. One or more instances of the app server 888 may be configured to execute all or a portion of the operations of the services described herein.

In some implementations, as discussed above, the pod 844 may include one or more database instances 890. A database instance 890 may be configured as an MTS in which different organizations share access to the same database, using the techniques described above. Database information may be transmitted to the indexer 894, which may provide an index of information available in the database 890 to file servers 886. The QFS 892 or other suitable filesystem may serve as a rapid-access file system for storing and accessing information available within the pod 844. The QFS 892 may support volume management capabilities, allowing many disks to be grouped together into a file system. The QFS 892 may communicate with the database instances 890, content search servers 868 and/or indexers 894 to identify, retrieve, move, and/or update data stored in the network file systems (NFS) 896 and/or other storage systems.

In some implementations, one or more query servers 882 may communicate with the NFS 896 to retrieve and/or update information stored outside of the pod 844. The NFS 896 may allow servers located in the pod 844 to access information over a network in a manner similar to how local storage is accessed. Queries from the query servers 822 may be transmitted to the NFS 896 via the load balancer 828, which may distribute resource requests over various resources available in the on-demand database service environment 800. The NFS 896 may also communicate with the QFS 892 to update the information stored on the NFS 896 and/or to provide information to the QFS 892 for use by servers located within the pod 844.

In some implementations, the content batch servers 864 may handle requests internal to the pod 844. These requests may be long-running and/or not tied to a particular customer, such as requests related to log mining, cleanup work, and maintenance tasks. The content search servers 868 may provide query and indexer functions such as functions allowing users to search through content stored in the on-demand database service environment 800. The file servers 886 may manage requests for information stored in the file storage 898, which may store information such as documents, images, basic large objects (BLOBS), etc. The query servers 882 may be used to retrieve information from one or more file systems. For example, the query system 882 may receive requests for information from the app servers 888 and then transmit information queries to the NES 896 located outside the pod 844. The ACS servers 880 may control access to data, hardware resources, or software resources called upon to render services provided by the pod 844. The batch servers 884 may process batch jobs, which are used to run tasks at specified times. Thus, the batch servers 884 may transmit instructions to other servers, such as the app servers 888, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 9:
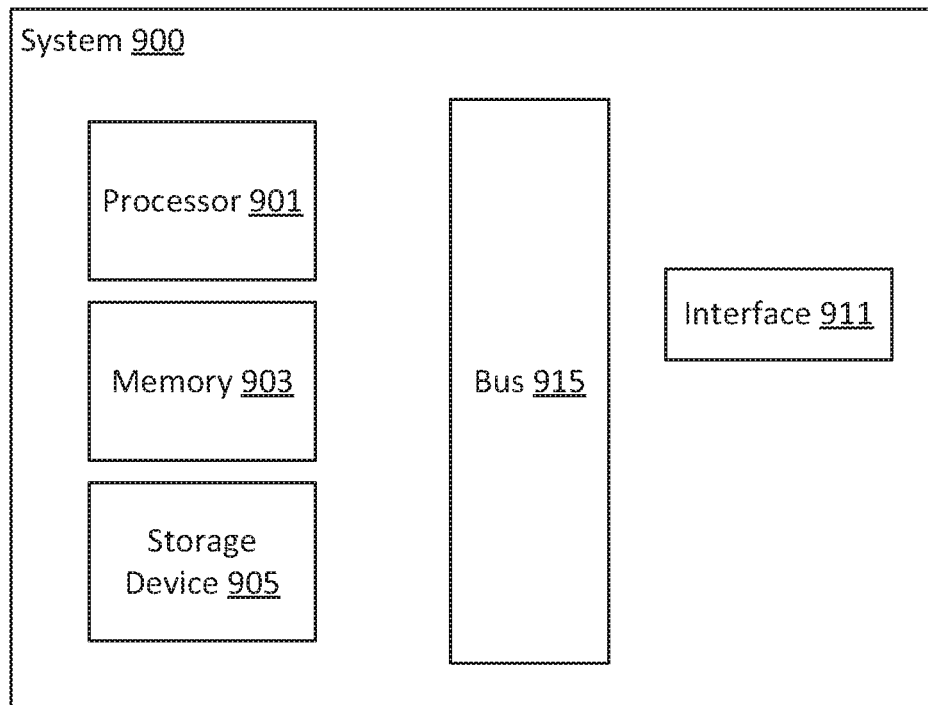
FIG. 9 illustrates one example of a computing device, configured in accordance with one or more embodiments.

FIG. 9 illustrates one example of a computing device. According to various embodiments, a system 900 suitable for implementing embodiments described herein includes a processor 901, a memory module 903, a storage device 905, an interface 911, and a bus 915 (e.g., a PCI bus or other interconnection fabric.) System 900 may operate as variety of devices such as an application server, a database server, or any other device or service described herein. Although a particular configuration is described, a variety of alternative configurations are possible. The processor 901 may perform operations such as those described herein. Instructions for performing such operations may be embodied in the memory 903, on one or more non-transitory computer readable media, or on some other storage device. Various specially configured devices can also be used in place of or in addition to the processor 901. The interface 911 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of the present invention apply to a wide variety of computing environments. Particular embodiments may be implemented without some or all of the specific details described herein. In other instances, well known process operations have not been described in detail in order not to unnecessarily obscure the present invention. Accordingly, the breadth and scope of the present application should not be limited by any of the implementations described herein, but should be defined only in accordance with the claims and their equivalents.

The invention claimed is:

1. A method comprising:
receiving via a communications interface a request to identify a data object that includes a first plurality of data values;
for each of the first plurality of data values, transmitting a respective object value identification query message that includes the data value to each of a plurality of identity nodes via a gossip communication protocol defining a peer-to-peer procedure for transmitting information among the plurality of identity nodes;
for each of the first plurality of data values, receiving a respective object value identification response message that includes a respective network identifier corresponding with the respective data value, wherein the respective network identifier is stored in a trust ledger shared among the plurality of identity nodes, the respective network identifier being associated in the trust ledger with a respective second one or more data values;

determining via a processor a local identifier based on the object value identification response messages, wherein the local identifier is selected by identifying a designated network identifier as the most common network identifier among the object value identification response messages; and transmitting a query response message including the local identifier via the communications interface.

2. The method recited in claim 1, wherein determining the local identifier further comprises querying a correspondence table using the designated network identifier, the correspondence table identifying a plurality of correspondence relationships between local identifiers and network identifiers.

3. The method recited in claim 1, wherein determining the local identifier further comprises creating the local identifier when it is determined that the designated network identifier does not correspond to an existing local identifier.

4. The method recited in claim 1, wherein each of the respective network identifiers is determined by consensus among the plurality of identity nodes.

5. The method recited in claim 1, wherein the data object is associated with a data object schema, the data object schema identifying one or more data fields associated with an instance of the data object schema, each of the first plurality of data values corresponding with a respective one of the data fields.

6. The method recited in claim 1, wherein the second one or more data values are hashed prior to storage in the trust ledger, the trust ledger capable of being queried to determine any network identifiers associated with a designated hashed data value.

7. The method recited in claim 1, wherein the trust ledger is implemented as a merkle tree.

8. The method recited in claim 1, wherein the trust ledger is implemented as a blockchain.

9. A database system implemented via a server system comprising:
  a communications interface operable to:
   receive a request to identify a data object that includes a first plurality of data values,
   for each of the first plurality of data values, transmit a respective object value identification query message that includes the data value to each of a plurality of identity nodes via a gossip communication protocol defining a peer-to-peer procedure for transmitting information among the plurality of identity nodes, and
   for each of the first plurality of data values, receive a respective object value identification response message that includes a respective network identifier corresponding with the respective data value, wherein the respective network identifier is stored in a trust ledger shared among the plurality of identity nodes, the respective network identifier being associated in the trust ledger with a respective second one or more data values; and
  a processor operable to:
   determine a local identifier based on the object value identification response messages, wherein the local identifier is selected by identifying a designated network identifier as the most common network identifier among the object value identification response messages, and
   instruct the communications interface to transmit a query response message including the local identifier via the communications interface.

10. The database system recited in claim 9, wherein determining the local identifier comprises querying a correspondence table using the designated network identifier, the correspondence table identify a plurality of correspondence relationships between local identifiers and network identifiers.

11. The database system recited in claim 9, wherein each of the respective network identifiers is determined by consensus among the plurality of identity nodes.

12. A computer program product comprising computer-readable program code capable of being executed by one or more processors when retrieved from a non-transitory computer-readable medium, the program code configurable to cause:
  processing a request received via a communications interface to identify a data object that includes a first plurality of data values;
  for each of the first plurality of data values, transmitting a respective object value identification query message that includes the data value to each of a plurality of identity nodes via a gossip communication protocol defining a peer-to-peer procedure for transmitting information among the plurality of identity nodes;
  for each of the first plurality of data values, receiving a respective object value identification response message that includes a respective network identifier corresponding with the respective data value, wherein the respective network identifier is stored in a trust ledger shared among the plurality of identity nodes, the respective network identifier being associated in the trust ledger with a respective second one or more data values;
  determining via a processor a local identifier based on the object value identification response messages, wherein the local identifier is selected by identifying a designated network identifier as the most common network identifier among the object value identification response messages; and
  transmitting a query response message including the local identifier via the communications interface.

13. The computer program product recited in claim 12, wherein determining the local identifier comprises querying a correspondence table using the designated network identifier, the correspondence table identify a plurality of correspondence relationships between local identifiers and network identifiers.

14. The computer program product recited in claim 12, wherein each of the respective network identifiers is determined by consensus among the plurality of identity nodes.

* * * * *